(12) United States Patent
White et al.

(10) Patent No.: US 6,454,274 B2
(45) Date of Patent: Sep. 24, 2002

(54) JOINT ASSEMBLY FOR JOINING A CERAMIC MEMBRANE TO A TUBE SHEET

(75) Inventors: James Eric White, Amherst, NY (US); Prasad Apte, East Amherst, NY (US); Thomas Gilbert Halvorson, Lockport, NY (US); Victor Emmanuel Bergsten, East Amherst, NY (US); Ajit Yeshwant Sane, Medina, OH (US); Terry Joseph Mazanec, Solon, OH (US)

(73) Assignees: Praxair Technology, Inc., Danbury, CT (US); BP Amoco Corporation, Chicago, IL (US)

( * ) Notice: Subject to any disclaimer, the term of this patent is extended or adjusted under 35 U.S.C. 154(b) by 6 days.

(21) Appl. No.: 09/809,389

(22) Filed: Mar. 15, 2001

Related U.S. Application Data

(63) Continuation-in-part of application No. 09/534,998, filed on Mar. 27, 2000, now abandoned.

(51) Int. Cl.⁷ .................................................. F16J 15/02
(52) U.S. Cl. ........................................ 277/630; 277/650
(58) Field of Search ................................. 277/606, 617, 277/627, 630, 637, 650

(56) References Cited

U.S. PATENT DOCUMENTS

| | | | |
|---|---|---|---|
| 4,394,023 A | | 7/1983 | Hinojosa |
| 4,784,743 A | * | 11/1988 | Iino et al. |
| 4,917,302 A | | 4/1990 | Steinetz et al. |
| 5,082,293 A | | 1/1992 | Steinetz et al. |
| 5,301,595 A | | 4/1994 | Kessie |
| 5,535,629 A | * | 7/1996 | Gerdes et al. |
| 5,820,654 A | | 10/1998 | Gottzmann et al. |
| 5,820,655 A | | 10/1998 | Gottzmann et al. |
| 6,322,680 B1 | * | 11/2001 | Itsygin |

* cited by examiner

*Primary Examiner*—Robert J. Sandy
*Assistant Examiner*—Karlena D. Schwing
(74) *Attorney, Agent, or Firm*—David M. Rosenblum

(57) ABSTRACT

A joint assembly for joining a ceramic membrane of tubular form to a tube sheet used in supporting the ceramic membrane within a reactor. The ceramic membrane is received within a fixture connected to the tube sheet and a follower, extending into the fixture, exerts a force on a high temperature sealing element located between the fixture and the ceramic membrane to effect a seal and to hold the ceramic membrane in place. The force can be exerted directly on the sealing element or on the ceramic membrane itself.

19 Claims, 4 Drawing Sheets

JOINT ASSEMBLY FOR JOINING A CERAMIC MEMBRANE TO A TUBE SHEET

RELATED APPLICATIONS

This is a continuation in part of U.S. Ser. No. 09/534,998, filed Mar. 27, 2000 now abandoned.

FIELD OF THE INVENTION

The present invention relates to a joint assembly for joining a ceramic membrane of tubular form to a tube sheet used in supporting the ceramic membrane within a reactor. More particularly, the present invention relates to such a joint assembly in which the ceramic membrane is received and sealed within a fixture connected to the tube sheet.

BACKGROUND OF THE INVENTION

Ceramic membranes are used to separate a gaseous component from a mixture, for instance, oxygen from air. Ceramic membranes are gas tight and function by allowing ions to selectively migrate through the membrane. The disassociation and ionization of the selected gas occurs at a membrane surface where electrons are picked up from near surface electronic states. The flux of the ions is charged compensated by a simultaneous flux of electronic charge carriers through the ceramic membrane. When the ions arrive at the opposite side of the membrane, the individual ions release their electrons and recombine to form gas molecules. The driving force for such transport can be a differential partial pressure of the selected gas applied across the membrane or an external source of electric power.

Ceramic membranes can be employed in the form of tubes located within reactors. Critical to the success of the reactor is both the survival of such ceramic membranes and adequate sealing at a location where the tubular ceramic element is joined with the reactor, generally at a tube sheet. Since ceramic membranes exhibit ion conductivity at temperatures that are well above 500° C., generally in the range of between about 600° C. and about 1000° C. the joint assembly and seal between the ceramic membrane and the tube sheet are subjected to extreme environmental conditions.

A major obstacle in developing a viable seal are the unique thermomechanical properties of ceramic materials, e.g. high thermal expansion and compositional dilation and the high operational temperatures of the membranes. Both factors prohibit the use of common fixed joining techniques such as glass sealing or brazing. Instead, joining techniques that do not rigidly affix the ceramic within the reactor are used such as non-bonding, compression type joint assembles. For instance, both U.S. Pat. Nos. 5,820,654 and 5,820,655 use either a sliding or fixed seal with a bellows at the juncture of the ceramic membrane and the tube sheet.

The prior art has provided high temperature seals that are used to seal structural panels. For instance, U.S. Pat. No. 4,917,302 utilizes a stack of ceramic wafers located within a rectangular groove along the side of a movable engine panel. The engine panel is sealed to an adjacent side wall by the ceramic wafers which are held in position by a pressurized linear bellows that also fits within the groove. U.S. Pat. No. 5,082,293 shows a similar seal except that the sealing element instead of consisting of a stack of wafers is made up of multiple layers of a fiber wound about a core. The materials for such fibers can be alumina-boriasilicate or silicon-carbide. U.S. Pat. No. 5,301,595 discloses a rope seal having a core of ceramic fibers and a cover of stainless steel. The rope seal is designed to seat within a groove in one component and bear against a flat wall of another component. U.S. Pat. No. 4,394,023 shows a high temperature valve stem packing that incorporates graphite seal rings composed of coiled graphite tape held between metal packing adapter rings that bear against the graphite seal rings.

All of the foregoing materials are attractive for sealing a ceramic membrane to a tube sheet due to their high temperature performance. As will be discussed, the present invention provides a joint assembly that is designed to advantageously utilize high temperature sealing materials, such as those identified above and to hold the ceramic membrane in place.

SUMMARY OF THE INVENTION

The present invention provides a joint assembly for joining a ceramic membrane of tubular configuration to a tube sheet. The joint assembly has a fixture connected to the tube sheet and including a passageway having a narrow end section, located at one end of the passageway, to receive the ceramic membrane. A sealing surface, defined by the passageway, is located at the one end thereof. The ceramic membrane extends through the narrow end section of the passageway so that an open end of the ceramic membrane is located within the passageway and an adjacent lateral surface of the membrane is surrounded by the sealing surface. At least one sealing element is located between the sealing surface and the lateral surface of the ceramic membrane. A follower is located within the passageway and bears against the at least one sealing element in a direction towards the narrow end section of the passageway. This action simultaneously drives the at least one sealing element against the sealing surface and the lateral surface of the ceramic membrane by compression of the at least one sealing element. As a result, a seal is effected between the fixture and the ceramic membrane and the ceramic membrane is held in place by frictional forces developed between the at least one sealing element and the ceramic membrane. The follower is provided with an inner passage in communication with the open end of the ceramic membrane to allow permeate or feed to flow through the follower.

The sealing surface can be formed by a tapered section of said passageway, tapering towards the narrow end section. In such case, the passageway is also provided with an annular end surface connecting the tapered section of said passageway with the narrow end section. The follower has a fusto-conical end element configured to fit within said tapered section of said passageway and to bear against said at least one sealing element.

In a further aspect of the present invention the fixture bears against the ceramic membrane to compress the at least one sealing element. In this aspect of the present invention, the fixture of the joint assembly includes a passageway having a narrow end section, located at one end of the passageway. A sealing surface surrounds and is located adjacent to the narrow end section. The ceramic membrane has an enlarged end portion at an open end thereof. The enlarged end portion is located within the passageway with the ceramic membrane extending from the narrow end section of the passageway. At least one sealing element is located between the sealing surface and the enlarged end portion of the ceramic membrane and a follower, located within the passageway, bears against the enlarged end portion of the ceramic membrane in a direction towards the narrow end section of the passageway. This action compresses the at least one sealing element between the sealing surface and the enlarged end portion of the ceramic membrane. As a result, a seal is effected between the fixture and the ceramic membrane and the ceramic membrane is held in place, against the sealing surface. The follower is provided with an inner passage in communication with the open end of the ceramic membrane to allow feed or permeate to flow through the follower.

The enlarged end portion of the ceramic membrane can be formed by an outwardly flared portion of the ceramic membrane to produce an outwardly flared lateral surface thereof. In such embodiment of the invention, the sealing surface is formed by a tapered section of the passageway, tapering towards the narrow end section. The at least one sealing element is a cone seal gasket located between said outwardly flared lateral surface and said sealing surface. An annular butt seal gasket is located between the follower and the open end of said ceramic membrane in alignment with the inner passageway of the follower.

In yet another alternative embodiment the sealing surface is an annular end surface of the passageway surrounding the narrow end section thereof. The enlarged end portion has an annular undersurface located opposite to the annular end surface and the at least one sealing element comprises a annular butt seal gasket located between said annular undersurface and said annular end surface. The follower also has an end section having a cavity configured to receive the enlarged end portion of said ceramic membrane. In such embodiment, the enlarged end portion of the ceramic membrane and the cavity can be of fusto-connical configuration. In such case, a cone-seal gasket is located between the enlarged end portion and the cavity. A butt seal gasket is located between the open end of the ceramic membrane and the follower, in alignment with the passage thereof.

The at least one sealing element can be formed of a rope-like packing wound around the lateral surface of the ceramic membrane. Alternatively, the at least one sealing element can be formed of a paper or felt stuffing of the ceramic material. The ceramic material can be an aluminosilicate fiber or a zirconia fiber. Advantageously, the ceramic material can be infiltrated with a particulate material and preferably such particulate material can be a ceramic or a metal. The sealing element can generally be formed of a ceramic mineral such as vermiculite. The at least one sealing element can also be formed of a layer of a ceramic powder or a graphite packing.

In any embodiment of the present invention, the fixture can be provided with an inlet port for introduction of a buffer gas into the fixture.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
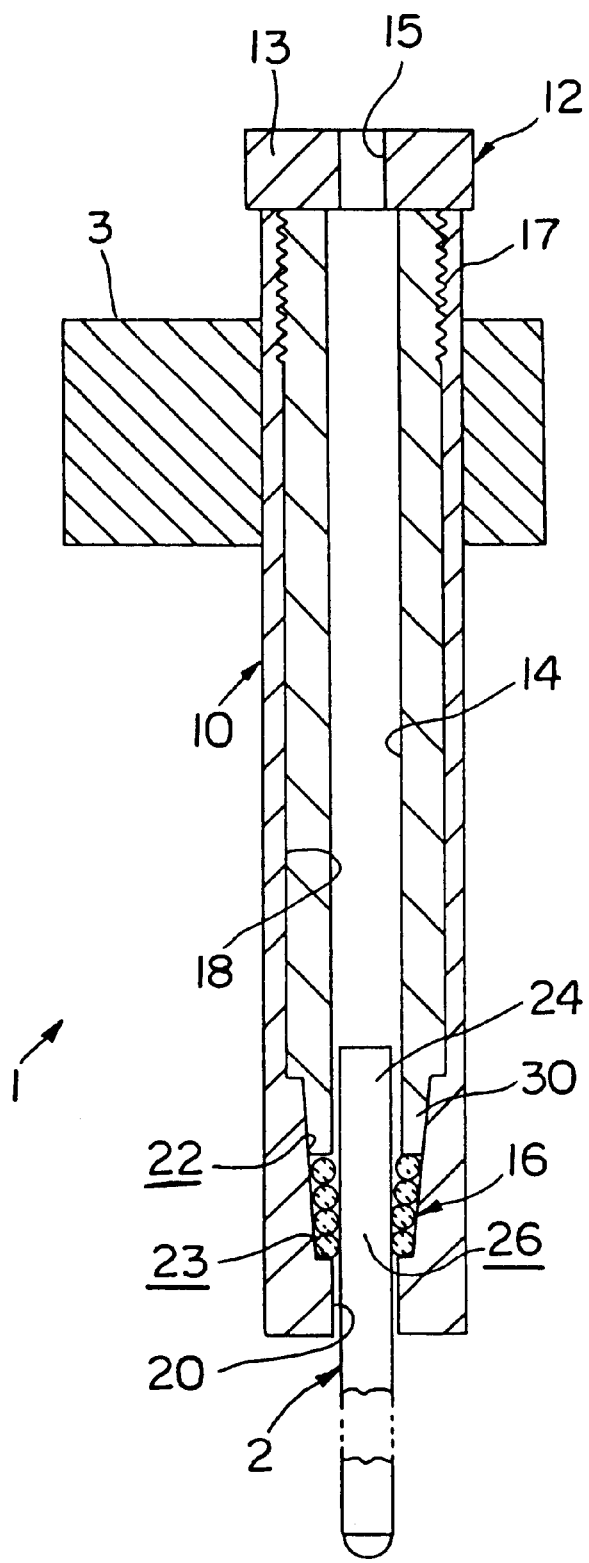
FIG. 1 is a schematic view of a joint assembly in accordance with the present invention.

With reference to FIG. 1, a joint assembly 1 is illustrated for sealing in open end of a ceramic membrane 2 of tubular configuration to a tube sheet 3. Joint assembly 1 includes a fixture 10 connected to tube sheet 3 and a follower 12 having a hex-like head 13.

Follower 12 and its hex-like head 13 are provided with internal bores 14 and 15, respectively, that form an inner passage to allow a permeate or feed stream to flow through follower 12 and therefore joint assembly 1. Follower 12 fits within the fixture 10 with a threaded engagement 17 to exert pressure against a sealing element 16. In this regard, hex-like head 13 of follower 12 facilitates the threading of follower 12 into fixture 10.

It is to be noted that fixture 10 and follower 12 can be fabricated from HAYNES 230 alloy. HAYNES 214 and INCOLOY 800 are other possible materials.

Figure 2:
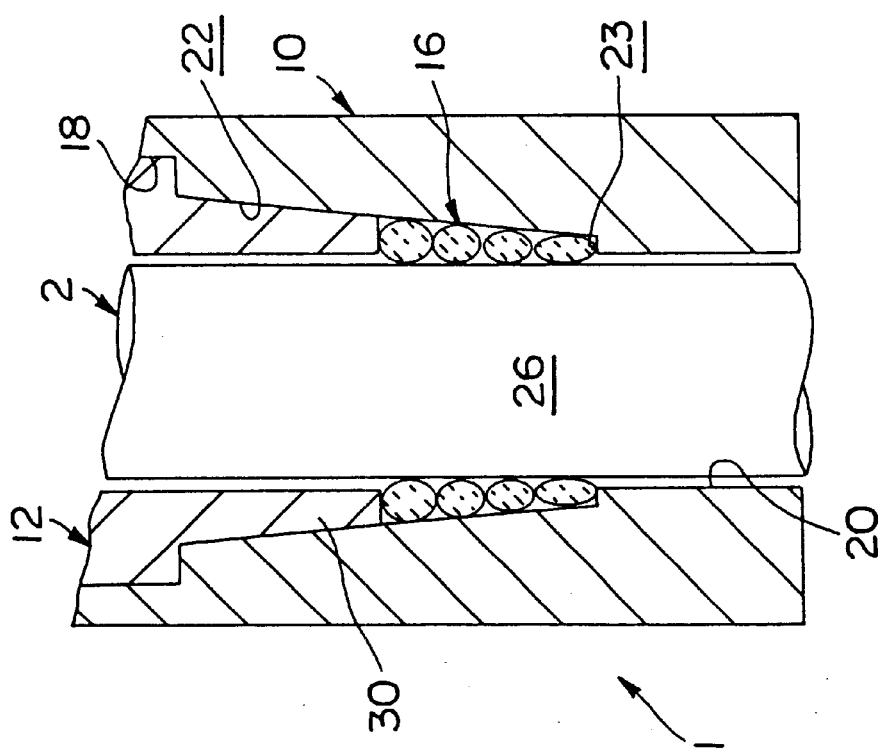
FIG. 2 is an enlarged fragmentary view of an embodiment of the joint assembly shown in FIG. 1.

With additional reference to FIG. 2, fixture 10 is provided with a passageway 18 having a narrow end section 20 located at one end of passageway 18. A sealing surface 22 is formed by an inner tapered section of a passageway 18 that tapers towards narrow end section 20. Narrow end section 20 and inner tapered sealing surface 22 are connected by an annular end surface 23. When an open end 24 of ceramic membrane 2 is received within narrow end section 20, an adjacent lateral surface 26 of ceramic membrane 2 is surrounded by sealing surface 22.

Sealing element 16 can be in the form of four coils of a rope-type packing is positioned between sealing surface 22 and lateral surface 26 of ceramic membrane 2 and against annular end surface 23.

The rope-type packing of sealing element 16 can be formed of an aluminosilicate fiber or a zirconia fiber. In this regard, sealing element 16 can be a rope-like material having a diameter of about 1.59 mm and formed of plied and twisted filaments of alumina-boriasilicate. Such filaments are sold commercially as NEXTEL 312 ceramic fibers as a product of 3M Ceramics Materials Department, 3M Center, St. Paul, Minn., 55144, United States. The particular rope-like material, described above, can be obtained in finished form from Coltronics Corp., Brooklyn, N.Y., United States, as item# CT301.

In addition to rope-like packings, sealing element 16 can be formed of a paper or felt stuffing of the ceramic material. Ceramic minerals are also possible such as vermiculite.

The sealing efficiency of any of the ceramic materials mentioned above can be enhanced by infiltrating the fibers with a particulate such as a refractory ceramic (e.g. $Al_2O_3$, $ZrO_2$, MgO and etc.), or a powder of ceramic material used in fabricating ceramic membrane 2, or possibly a metal such as gold. The particulate material can be applied by dipping or spraying a slurry.

Follower 12 is provided with a fusto-conical end element 30 that fits within the tapered section of passageway 18. End element 30 bears against sealing element 16 in a direction taken towards narrow end section 20 by action of threaded engagement 17. This action drives sealing element 16 against sealing surface 22, lateral surface 26 of ceramic membrane 2, and annular end surface 23, thereby to compress sealing element 16. As a result, a seal is effectuated between fixture 10 and ceramic membrane 2 and therefore also tube sheet 3 due to the connection of fixture 10 and tube sheet 3. At the same time a strong frictional engagement is produced to hold ceramic membrane 2 in place.

Good sealing results were obtained for a ceramic membrane having an outer diameter of about 1.27 cm. and with a sealing element 16 as has been specifically described above and illustrated in FIG. 1. Such results were obtained with sealing surface 22 having a length of about 1.9 cm.(as measured along the side of fixture 10) and a taper of about 3 degrees. Annular end surface 23 had a width, as measured along a radius thereof, of about 1.02 mm. When joint assembly 1 was completely assembled, sealing element 16 was compressed to a length (as measured along the side of fixture 10) of about 9.53 mm.

Figure 3:
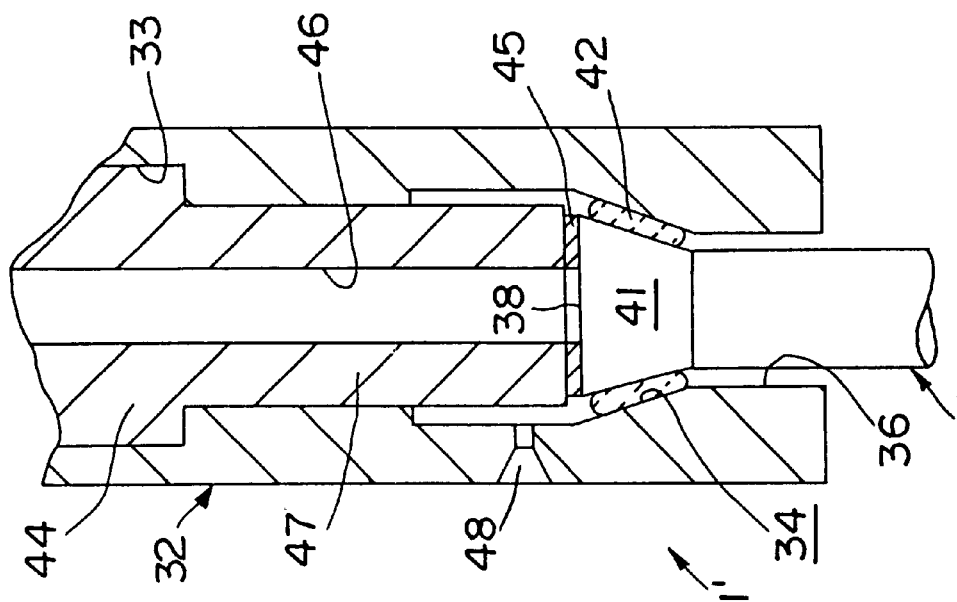
FIG. 3 is an enlarged fragmentary view of an alternative embodiment of the joint assembly shown in FIG. 1.

FIG. 3 illustrates a joint assembly 1' that is used to join a ceramic membrane 2' to a tube sheet such as that designated by reference numeral 3. Joint assembly 1' includes a fixture 32 that is connected to the tube sheet 3. Fixture 32 is provided with a passageway 33 having a tapered section to form a sealing surface 34 surrounding and located adjacent to a narrow end section 36 of passageway 33. As illustrated, ceramic membrane 2' projects from narrow end section 36 of passageway 33. Ceramic membrane 2' is provided with an enlarged end portion 40 located at an open end 38 thereof, that is outwardly flared to produce an outwardly flared lateral surface 41. When ceramic membrane 2' is positioned within narrow end section 36, lateral surface 41 of ceramic membrane 2' is surrounded by sealing surface 34.

A sealing element 42 in the form of a cone seal gasket fits between sealing surface 34 and lateral surface 41 of ceramic membrane 2'. An optional, annular butt seal gasket 45 is positioned between a follower 44 extended into passageway 33 of fixture 32 and in alignment an internal bore 46 of a passageway for the flow of a permeate through fixture 33. Sealing element 42 and annular butt seal gasket 45 can be fabricated from a ceramic fiber paper (formed from the same materials set forth above). Although not illustrated, sealing element 42 and annular butt seal gasket 45 could be replaced by a wound rope-like seal as illustrated for sealing element 16.

Although not illustrated, follower 44 and fixture 32 can be provided with a threaded engagement in the same manner as threaded engagement 17 of fixture 10 and follower 12. Follower 44 is provided with a cylindrical end element 47 to bear against annular butt seal gasket 45 when follower 44 is driven within fixture 32 by such threaded engagement. This acts to provide a seal between bore 46 and open end 38 of ceramic membrane 2'. Furthermore, such action in turn forces lateral surface 41 of ceramic membrane 2' against sealing element 42 and sealing surface 34. As a result, sealing element 42 is compressed to seal ceramic membrane 2' within fixture 32 and therefore also with respect to the tube sheet. At the same time, ceramic membrane 2' is held in place due to the force exerted by follower 44.

It is to be noted that in many applications, a seal produced by a joint assembly in accordance with the present invention will produce some leakage of a permeate such as oxygen. In order to prevent leakage, fixture 32 can optionally be provided with an enlarged bore 46 adjacent to inner tapered sealing surface 34 and an inlet port 48 in communication with bore 34 to allow introduction of an inert buffer gas to prevent leakage from the sealing arrangement described above. Fixture 10 could be provided with a similar arrangement.

Figure 4:
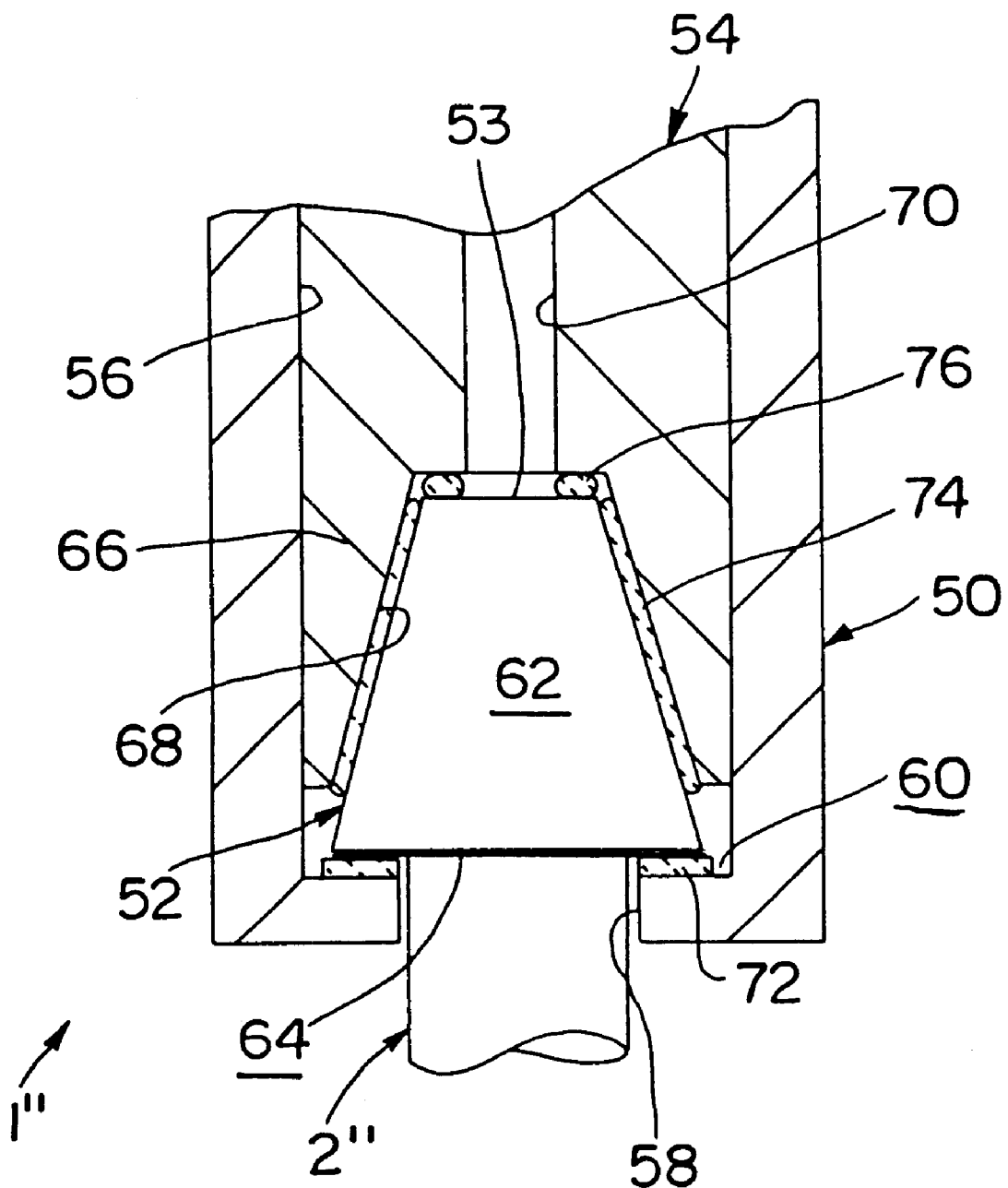
FIG. 4 is a schematic view of an alternative embodiment of a joint assembly in accordance with the present invention.

With reference to FIG. 4, is an alternative embodiment illustrating a joint assembly 1" that is used to join a ceramic membrane 2" to tube sheet 3. Joint assembly 1" is provided with a fixture 50 connected to tube sheet 3. A ceramic membrane 2" is fabrication with an enlarged end portion 52 located at an open end 53 thereof. Enlarged end portion 52 fits within fixture 50 with the remainder of ceramic membrane 21' projecting from fixture 50. A follower 54 by a threaded connection (not shown but as in other embodiments) bears against enlarged end portion 52.

Fixture 50 includes a passageway 56 having a narrow end section 58, and an annular end surface 60 surrounding and adjacent to the narrow section 58 of passageway 56. Enlarged end portion 52 has a fusto-conical configuration to provide a cone-shaped lateral surface 62 and an annular undersurface 64 that is located opposite to the annular end surface 60 when ceramic membrane 2" is received within fixture 50. Follower 54 has an end section 66 to bear against enlarged end portion 52. End section 66 has a cavity 68 also of fusto-conical configuration to receive enlarged end portion 52 of the ceramic membrane 2". Cavity 68 is in communication with one end of a bore 70 serving as an inner passage for permeate to flow through follower 54.

A sealing element 72 in the form of annular butt seal gasket is located between annular undersurface 64 and annular end surface 60 to seal ceramic membrane 2" within fixture 50 when follower 54 is driven towards narrow end section 56 and therefore annular end surface 60. A cone seal gasket 74 can optionally be provided to seal enlarged end portion 52 within cavity 68. Furthermore, an annular butt seal gasket 76, located between open end 53 of ceramic membrane 2" and follower 50 and in alignment with bore 70, can optionally be provided to seal bore 70 to open end 53 of ceramic membrane 2".

Figure 5:
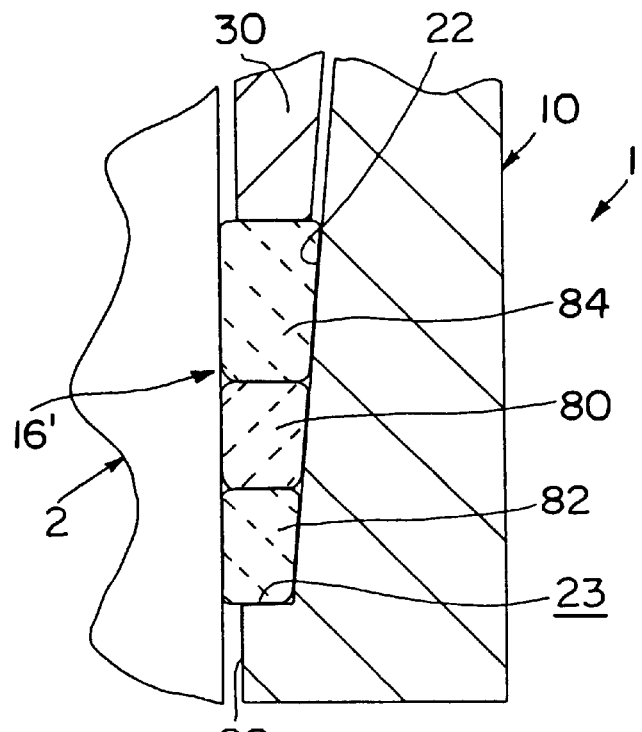
FIG. 5 is an enlarged fragmentary view of an alternative embodiment of sealing elements used in the embodiment shown in FIG. 2.
Figure 6:
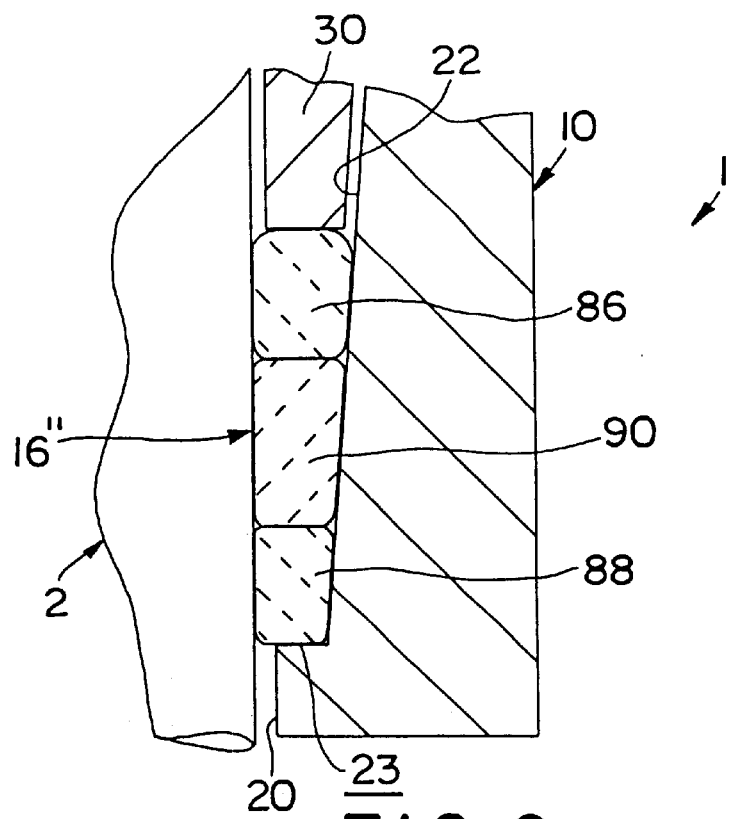
FIG. 6 is an enlarged fragmentary view of an alternative embodiment of sealing elements used in the embodiment shown in FIG. 2.

With reference to FIG. 5, in place of a sealing element 16 for joint assembly 1, a sealing element 16' can be provided that consists of two coils 80 and 82 of a rope-type packing and a layer of a mineral or graphite packing 84. With reference to FIG. 6 a sealing element 16" can be provided in place of sealing element 16 that consists of two coils 86 and 88 of a rope-type packing sandwiching a mineral or graphite packing 90.

Other types of sealing elements are possible. However, any sealing element used to effectuate a seal in the extreme environment contemplated by the present invention must be designed to retain its shape within a temperature range of between about 700° C. and about 1200° C. It is important that the seal be able to withstand an oxygen partial pressure within a pressure range of between about $10^{-18}$ atmospheres and about 3 atmosphere. Further, any such sealing element should additionally be able to withstand an absolute pressure within the pressure range of between about 1 atmospheres and about 70 atmospheres.

Other types of fixtures in accordance with the present invention are possible. For instance, fixture 10 could be modified by continuing passageway 18 to narrow end section 20 with a constant diameter. As a result, the fixture would not have a tapered sealing surface 22 nor would follower 12 have a fusto-conical end element 30. Through action of a threaded engagement between the follower and the fixture, a sealing element such as a rope seal could be compressed against the base of such modified bore to cause an outward deformation of the sealing element. The outward deformation surfaces of the sealing element would bear against both fixture and ceramic membrane to effect a seal with a frictional engagement to hold the membrane in place.

A modification to joint assembly 1" is also possible though use of a fixture having a bore of constant diameter, as has been discussed above. In such modification, enlarged end portion 52 would be given a cylindrical configuration and rope-like packing elements might be provided both between the lateral surface of the enlarged end portion and the passageway of the fixture and between the undersurface of such enlarged end portion and the annular end surface of the passageway. A cylindrical cavity at the end of the follower would at once receive the enlarged end portion, bear against packing elements located between the enlarged end portion and the surface of the passageway and also bear against the end section of the ceramic membrane to compress the packing element located between its undersurface and the annular end surface of the passageway. Thus, such embodiment would have elements of either joint assemblies 1 and 1". The claims therefore are meant to cover such an embodiment.

A further possible modification to the illustrated preferred embodiments as has been discussed with reference to either joint assembly 1, joint assembly 1' or joint assembly 1''' is to use locking pins in place of a threaded engagement such that designated by reference numeral 17.

While the invention has been described with reference to a preferred embodiment, as will occur to those skilled in the art, numerous changes, additions and omissions can be made without departing from the spirit and the scope of the present invention.

What is claimed is:

1. A joint assembly for joining a ceramic membrane of tubular configuration to a tube sheet, said joint assembly comprising;
    a fixture connected to said tube sheet, said fixture including a passageway having a narrow end section, located at one end of said passageway, to receive said ceramic membrane, and a sealing surface defined by said passageway and located at said one end thereof;
    said ceramic membrane extending through said narrow end section of said passageway so that an open end of said ceramic membrane is located within said passageway and an adjacent lateral surface of said membrane is surrounded by said sealing surface;
    at least one sealing element located between said sealing surface and a lateral surface of said ceramic membrane;
    a follower located within the passageway and bearing against said at least one sealing element in a direction towards said narrow end section of said passageway, thereby simultaneously driving said at least one sealing element against said sealing surface and said lateral surface of said ceramic membrane by compression of said at least one sealing element to effect a seal between said fixture and said ceramic membrane and to hold said ceramic membrane in place by frictional forces developed between said at least one sealing element and said ceramic membrane;
    the follower having an inner passage in communication with the open end of said ceramic membrane to allow permeate or feed to flow through said follower.

2. A joint assembly for joining a ceramic membrane of tubular configuration to a tube sheet, said joint assembly comprising;
    a fixture connected to said tube sheet, said fixture including a passageway having a narrow end section located at one end of said passageway and a sealing surface surrounding and located adjacent to the narrow end section;
    said ceramic membrane having an enlarged end portion at an open end thereof, the enlarged end portion located within said passageway with said ceramic membrane extending from said narrow end section of said passageway;
    at least one sealing element located between said sealing surface and said enlarged end portion of said ceramic membrane; and
    a follower located within the passageway and bearing against said enlarged end portion of said ceramic membrane in a direction towards said narrow end section of said passageway, thereby compressing said at least one sealing element between said sealing surface and said enlarged end portion of said ceramic membrane to effect a seal between said fixture and said ceramic membrane and to hold said ceramic membrane in place, against said sealing surface;
    the follower having an inner passage in communication with the open end of said ceramic membrane to allow permeate or feed to flow through said follower.

3. The joint assembly of claim 1 or claim 2, wherein said at least one sealing element is formed of a rope-like packing.

4. A joint assembly of claim 1 or claim 2, wherein said at least one sealing element is formed of a paper or felt stuffing of said ceramic material.

5. The joint assembly of claim 3, wherein said ceramic material is an aluminosilicate fiber or a zirconia fiber.

6. The joint assembly of claim 4, wherein said ceramic material is an aluminosilicate fiber or a zirconia fiber.

7. The joint assembly of claim 3, wherein said ceramic material is infiltrated with a particulate material.

8. The joint assembly of claim 4, wherein said ceramic material is infiltrated with a particulate material.

9. The joint assembly of claim 4, wherein said particulate material is a ceramic.

10. The joint assembly of claim 4, wherein said particulate material is a metal.

11. The joint assembly of claim 1 or claim 2, wherein said at least one sealing element is formed of a ceramic mineral.

12. The joint assembly of claim 11, wherein said ceramic mineral is vermiculite.

13. The joint assembly of claim 3, wherein said at least one sealing element is also formed of a layer of a ceramic powder or a graphite packing.

14. The joint assembly of claim 4, wherein said at least one sealing element is also formed of a layer of a ceramic powder or a graphite packing.

15. The joint assembly of claim 1, wherein:
    said sealing surface is formed by a tapered section of said passageway, tapering towards said narrow end section;
    said passageway also has an annular end surface connecting said tapered section of said passageway with said narrow end section; and
    said follower has a fusto-conical end element configured to fit within said tapered section of said passageway and bear against said at least one sealing element.

16. The joint assembly of claim 2, wherein:
    said enlarged end portion of said ceramic membrane is formed by an outwardly flared portion of said ceramic membrane to produce an outwardly flared lateral surface thereof;
    said sealing surface is formed by a tapered section of said passageway, tapering towards said narrow end section;
    said at least one sealing element is a cone seal gasket located between said outwardly flared lateral surface and said sealing surface; and
    an annular butt seal gasket is located between said follower and said open end of said ceramic membrane in alignment with the inner passage of the follower.

17. The joint assembly of claim 2, wherein:

said sealing surface is an annular end surface of said passageway surrounding said narrow end section thereof;

said enlarged end portion has an annular undersurface located opposite to said annular end surface;

said at least one sealing element comprises a annular butt seal gasket located between said annular undersurface and said annular end surface; and said follower has an end section having a cavity configured to receive said enlarged end portion of said ceramic membrane.

18. The joint assembly of claim 17, wherein:

said enlarged end portion of said ceramic membrane and said cavity are of fusto-connical configuration;

a cone-seal gasket is located between said enlarged end portion and said cavity; and a butt seal gasket is located between said open end of said ceramic membrane and said follower in alignment with said inner passage thereof.

19. The joint assembly of claim 1 or claim 2, wherein said fixture further has an inlet port for introduction of a buffer gas into said fixture.

* * * * *